(12) United States Patent
Shah

(10) Patent No.: US 7,464,211 B2
(45) Date of Patent: Dec. 9, 2008

(54) METHOD OF DETECTING AND RECOVERING A LOST SYSTEM MANAGEMENT INTERRUPT (SMI) IN A MULTIPROCESSOR (MP) ENVIRONMENT

(75) Inventor: Mehul Mahendrabhai Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 11/531,740

(22) Filed: Sep. 14, 2006

(65) Prior Publication Data

US 2008/0071957 A1    Mar. 20, 2008

(51) Int. Cl.
*G06F 13/24* (2006.01)
*G06F 13/32* (2006.01)

(52) U.S. Cl. ...................... 710/267; 710/260
(58) Field of Classification Search .................. 710/260, 710/267
See application file for complete search history.

(56) References Cited

U.S. PATENT DOCUMENTS

| | | | |
|---|---|---|---|
| 6,571,206 B1 | 5/2003 | Casano et al. | |
| 6,775,728 B2 | 8/2004 | Zimmer et al. | |
| 2002/0099893 A1 | 7/2002 | Nguyen et al. | |
| 2005/0086405 A1 | 4/2005 | Kobayashi et al. | |
| 2005/0086547 A1* | 4/2005 | Kobayashi et al. | 713/310 |
| 2006/0047876 A1 | 3/2006 | Stultz | |
| 2007/0150632 A1* | 6/2007 | Ayyar et al. | 710/260 |

FOREIGN PATENT DOCUMENTS

WO    WO 2005036398 A1 *    4/2005

* cited by examiner

Primary Examiner—Paul R. Myers
Assistant Examiner—Ryan M. Stiglic
(74) Attorney, Agent, or Firm—Cynthia Byrd; Jeffrey L. Streets

(57) ABSTRACT

A method for handling multiple system management interrupt (SMI) events in a multiprocessor system. The method comprises a first set of one or more processors in the multiprocessor system receiving a first SMI event. The first set of processors then enter an SMI handler for the first SMI event. The method further comprising determining that fewer than all of the active processors in the multiprocessor system are in the SMI handler for the first SMI event, and scheduling a second SMI event based upon the content of the first SMI event. The first set of processors each exit the SMI handler for the first SMI event without handling the first SMI event. Preferably, the method includes handling the second SMI event as a result of determining that all of the active processors in the multiprocessor system are in the SMI handler for the second SMI event.

9 Claims, 2 Drawing Sheets

METHOD OF DETECTING AND RECOVERING A LOST SYSTEM MANAGEMENT INTERRUPT (SMI) IN A MULTIPROCESSOR (MP) ENVIRONMENT

BACKGROUND OF THE INVENTION

1. Field of the Invention

The present invention is related to methods for handling system management interrupts in a multiprocessor system.

2. Background of the Related Art

Since the 386SL processor was introduced by the Intel Corporation, SMM has been available on IA32 processors as an execution mode hidden to operating systems that executes code loaded by BIOS or firmware. SMM is a special-purpose operating mode provided for handling system-wide functions like power management, system hardware control, or proprietary OEM-designed code. The execution mode is deemed "hidden" because the operating system (OS) and software applications cannot see it, or even access it.

IA32 processors are enabled to enter SMM via activation of an SMI (System Management Interrupt) signal. A similar signal called the PMI (Processor Management Interrupt) signal that is roughly analogous to the SMI signal is used for Itanium.™-class processors. For simplicity, both SMI and PMI signals are sometimes referred to as xMI signals herein. There is also an interrupt message type called "SMI" or "PMI" that use the APIC/XAPIC IA32 memory-mapped delivery mechanism or the IPF SAPIC delivery mechanism.

The processor architecture of a computer system will typically support several types of interrupts. An interrupt is a notification given to the processor that causes the processor to halt the execution of code such as operating code and handle a condition that has arisen in the system or in one of the system's external devices. As an example, when a key is pressed on the keyboard, an interrupt is passed to the processor from the peripheral controller. The interrupt causes the processor to momentarily stop its current execution stream and receive data from the peripheral controller. Another type of interrupt is a system management interrupt (SMI). Typically, a SMI is the highest priority non-maskable interrupt that can be issued in a computer system. A SMI is often issued when it is necessary for the processor to handle an error condition in the computer system.

When a system management interrupt is issued to the processor, the processor enters system management mode. In a multiple processor environment, because every processor receives the system management interrupt, each of the processors of the computer system will enter system management mode. As part of system management mode, each processor of the system is allocated a memory block of random access memory (RAM). This memory space is known as system management RAM or SMRAM. Upon entering system management mode, each processor saves the contents of its registers to its block of allocated SMRAM space. In addition, the contents of SMRAM will also include the operating code used by each processor's SMI handler.

Placing the processor in system management mode frees the processor from the exclusive control of the operating system. Because the processor is able to operate independently of the operating system, privileged level functions of the processor, including some memory and I/O functions, are no longer under the exclusive control of the operating system. As a result, some processor level functions can be manipulated by the application program by invoking the processor's system management mode and the routines of the SMI handler or the processor.

In multiple processor computer systems, the time required for the handling of a system management interrupt is influenced by the amount of time spent saving processor information to and restoring processor information from the SMRAM associated with each processor. Typically, in a multiple processor computer system, each processor of the computer system will enter a system management interrupt mode, even though only one processor of the computer system will be selected to actually handle the processing associated with the system management interrupt. As such, in a multiprocessor system, each processor must have control of the processor bus and access to system memory in order to enter into and exit from the system management interrupt mode. Because each processor typically attempts to enter into and exit from system management interrupt mode at the same time, the processors typically contend for control of the processor bus and access to memory. Because only one processor may use the processor bus at a time, the processors are unlikely to enter or exit SMM at the same time.

The SMI handler associated with any particular processor can only handle one current SMI event and latch one pending SMI event. If multiple SMI events are received when one or more processors are in SMI and one or more other processors are not in SMI, then certain processors may loose an SMI. This is because the processors in SMI keep the first SMI pending & discard the others, while the processors not in SMI enter the SMM due to the first SMI, keep the second SMI pending & discard the others. So, processors that loose an SMI may eventually exit the SMI handler before the rest of the processors. This causes a problem, because the processors remaining in the SMI handler need to process an SMI, but can't do so without all of the active processors in SMI. Essentially, the latency between multiple processors entering and exiting SMM can cause difficulties in handling multiple SMI events.

Therefore, there is a need for an improved method for handling multiple SMI events in a multiprocessor system. It would be desirable if the method would detect a lost SMI event and recover the lost SMI so that it can be handled appropriately. It would be further desirable if the method could be applied to multiprocessor systems having any number of processors.

SUMMARY OF THE INVENTION

One embodiment of the present invention provides a method for handling multiple system management interrupt (SMI) events in a multiprocessor system. The method comprises a first set of one or more processors in the multiprocessor system receiving a first SMI event. The first set of processors then enter an SMI handler for the first SMI event. The method further comprising determining that fewer than all of the active processors in the multiprocessor system are in the SMI handler for the first SMI event, and scheduling a second SMI event based upon the content of the first SMI event. The first set of processors each exit the SMI handler for the first SMI event without handling the first SMI event. Preferably, the method includes handling the second SMI event as a result of determining that all of the active processors in the multiprocessor system are in the SMI handler for the second SMI event.

In another embodiment, the step of determining that fewer than all of the active processors in the multiprocessor system are in the SMI handler for the first SMI event includes waiting for a period of time before scheduling the second SMI event, wherein the period of time has a duration sufficient to allow processors to enter the SMI handler for the first SMI event under typical conditions had the first SMI event been received.

In a further embodiment, the first set of processors each exit the SMI handler for the first SMI event before the occurrence of the second SMI event. Optionally, the method may further comprise allowing the first set of processors to enter the SMI handler for a third SMI event that was pending while the first set of processors were in the SMI handler for the first SMI event, and handling the third SMI event so long as all of the active processors in the multiprocessor system are in the SMI handler for the third SMI event.

In yet another embodiment, a computer program product comprises a computer useable medium including a computer readable program, wherein the computer readable program when executed on a multiprocessor computer cause one or more of the processors in the computer to receive a first SMI event, enter an SMI handler for the first SMI event, determine that fewer than all of the active processors in the multiprocessor system are in the SMI handler for the first SMI event, then schedule a second SMI event based upon the content of the first SMI event, and then exit the SMI handler for the first SMI event without handling the first SMI event. Preferably, the computer readable program when executed on a multiprocessor computer further causes one or more of the processors in the computer to handle the second SMI event as a result of determining that all of the active processors in the multiprocessor system are in the SMI handler for the second SMI event.

In a still further embodiment, a computer system comprises multiple processors capable of receiving a system management interrupt event, an SMI handler for processing system management interrupt, a logic structure for a first set of one or more processors in the multiprocessor system receiving a first SMI event, a logic structure for the first set of processors entering an SMI handler for the first SMI event, a logic structure for determining that fewer than all of the active processors in the multiprocessor system are in the SMI handler for the first SMI event, a logic structure for scheduling a second SMI event based upon the content of the first SMI event, and a logic structure for the first set of processors each exiting the SMI handler for the first SMI event without handling the first SMI event.

DETAILED DESCRIPTION

Figure 1:
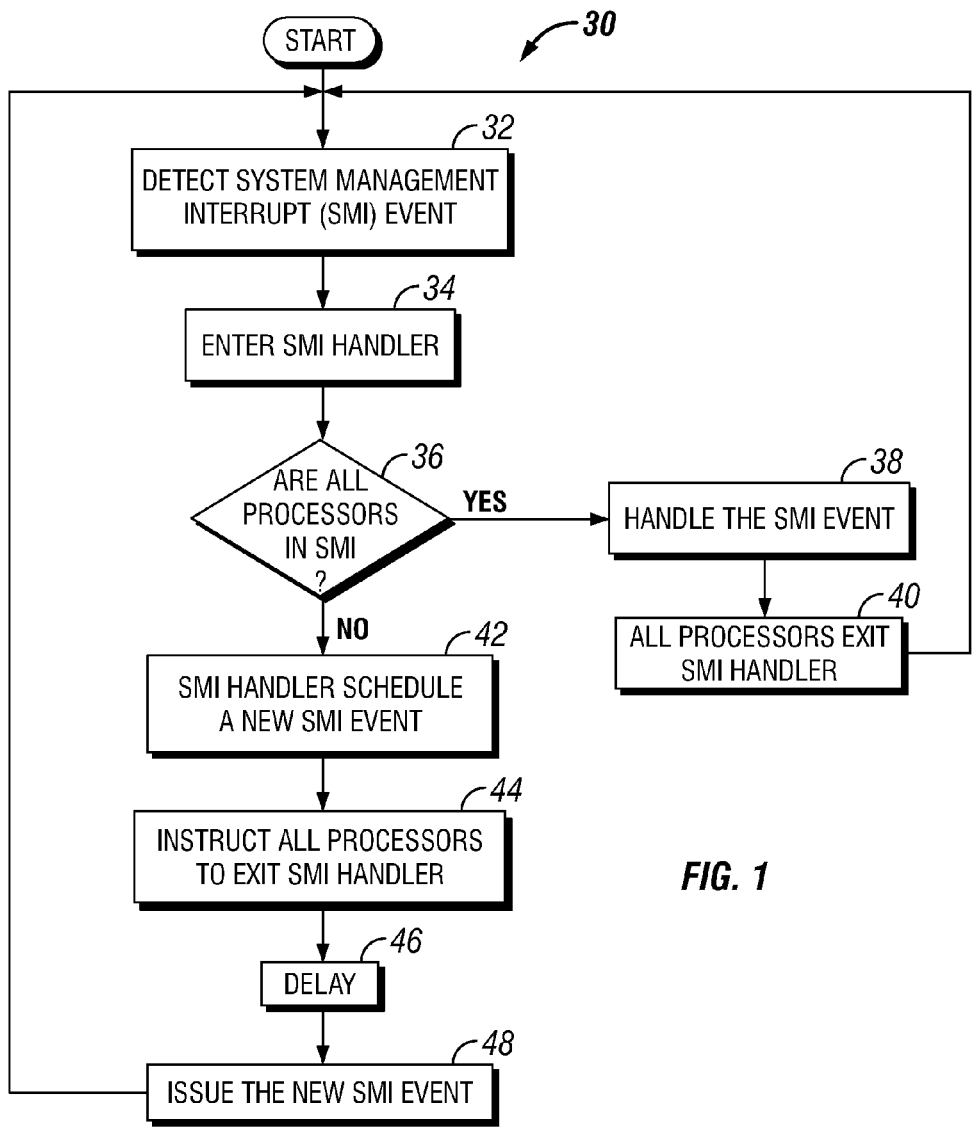
FIG. 1 is logic diagram of a method for handling multiple SMI events in a multiprocessor system.

The present invention provides a method for handling multiple SMI events in a multiprocessor system. Specifically, the method detects conditions indicating that one or more processors in the multiprocessor system has lost an SMI event, then takes steps to recover or replace the lost SMI event so that it can be handled. An SMI handler for processing system management interrupts includes a computer program product that can perform the method. In some embodiments, the SMI handler may cooperate with other computer program products or objects in order to schedule or issue an SMI. Still further, a computer system comprising multiple processors that are capable of receiving an SMI event may include the novel SMI handler and a logic structure for performing the method.

In response to a first set of one or more processors in the multiprocessor system receiving a first SMI event, each of the processors in the first set enter system management mode (SMM) and execute SMI handler code for the first SMI event. If all of the processors in the multiprocessor system are in the SMI handler for the same SMI event at the same time, then one of the processors handles the SMI and issues a resume (RSM) instruction that allows all of the processors to resume executing the interrupted application or operating system program or task by restoring the processor's context via loading the state save image from SMRAM back into the processor's registers.

Techniques are known for selecting which of the processors having received the SMI event will respond to and handle the SMI event. The SMI handler of the selected processor will determine whether all of the active processors in the multiprocessor system are in their SMI handler for the first SMI event. Preferably the SMI handler of the selected processor will wait for a period of time after entering the SMI handler before scheduling the second SMI event. Most preferably, the wait period has a duration sufficient to allow processors to enter the SMI handler for the first SMI event under typical conditions had the first SMI event been received. In other words, the wait period is preferably just longer than a typical latency between an SMI event and the last processor entering an SMI handler. By using an appropriate wait period, it is possible to avoid scheduling additional SMI events except in those instances where a processor has actually lost an SMI event.

If it is determined that fewer than all of the active processors are in their SMI handler for the first SMI event, then the SMI handler of the selected processor schedules a second SMI event based upon the content of the first SMI event. The SMI is scheduled using an OS independent manner using platform specific resources that are hidden from the OS. For example, using a timer that is exclusively available to the SMI handler, which is programmed by the SMI handler to cause another SMI after a delay.

After a new SMI event has been scheduled, the first set of processors each exit their respective SMI handler for the first SMI event without handling the first SMI event. After exiting the SMI handler, each of the processors is then able to accept another SMI event. This other SMI event may be either a pending SMI event that was already latched, or the other SMI event may be the scheduled SMI event. Optionally, a latched and pending SMI event is handled before the scheduled SMI event. In either event, the scheduled SMI event is preferably scheduled to be issued only after the processors that were in the SMI handler for the first SMI event have had time to exit the SMI handler. Optionally, the SMI event may be scheduled at a specific time, following a specific time period, or in response to the occurrence of a particular event such as detecting the processors have in fact exited the SMI handler. The delay allows the processors to return back to the operating system and make forward progress. This is to ensure that the operating system doesn't loose too much time to the SMI handler due to back-to-back SMIs. The delay also allows the operating systems to soft reset one or more processors, because processors don't recognize SMI, while in soft reset state.

In response to receiving the scheduled SMI event, the processors enter the SMI handler for the scheduled SMI event. If the processor that is selected to handle the SMI event determines that all of the active processors in the multiprocessor system are in the SMI handler for the SMI event, then the selected processor handles the SMI event. However, if there is again fewer than all of the active processors are in the SMI handler, then the SMI handler of selected processor would schedule a second scheduled SMI event based upon the content of the first scheduled SMI event. The process of scheduling SMI events could repeat any number of times in order to achieve the goal of getting all of the active processors in the multiprocessor system into the SMI handler to handle the scheduled SMI event.

After the selected processor has scheduled a further SMI event (i.e., a second SMI event to replace the first SMI event) and the first set of one or more processors in the SMI handler have exited the SMI handler (in response to an RSM instructions from the selected processor), then the first set of one or more processors may still have a latched or pending SMI event (i.e., a third SMI event) that will cause the processors to re-enter their SMI handler. In one embodiment, the SMI handler of the same or different selected processor will schedule yet another SMI event (i.e., a fourth SMI event to replace the pending third SMI event), then exit the SMI handler. As a result, all of the processors in the multiprocessor system should be out of the SMI handler with no latched or pending SMI events, but two scheduled SMI events (i.e., the second and fourth SMI events) that will soon be issued. In an alternative embodiment, the first set of processors are allowed to enter the SMI handler for a latched or pending SMI event (i.e., the second SMI event) that was pending while the first set of processors were in the SMI handler for the first SMI event, and then handling the second SMI event so long as all of the active processors in the multiprocessor system are in the SMI handler for the second SMI event. However, if fewer than all of the active processors in the multiprocessor system are in the SMI handler for the same SMI event, then it is still necessary to schedule an additional SMI event (a fourth SMI event) for an SMI event (a second SMI event) that was pending while the first SMI event was in the SMI handler, wherein the additional SMI is based upon the content of the pending second SMI event. After scheduling the additional SMI event, the pending SMI event may be canceled without handling the pending SMI event.

If any of the first set of processors have an SMI handler with a pending SMI even at the time that the second SMI event is being scheduled, then it is important that the first set of processors each exit the SMI handler for the first SMI event before the occurrence of the second SMI event. Otherwise, it is possible that the first set of processors could loose the scheduled SMI event.

EXAMPLES

Example 1

A Two Processor System (Hypothetical)

A two processor system is the simplest multiprocessor system to discuss, yet allows for an adequate description of the methods of the present invention. However, the invention may be implemented in systems have any number of two or more processors.

In Table 1, a hypothetical sequence of events is set out in order from top to bottom. Some events have been illustrated as occurring in the same "step", although this is merely an illustration and should not be taken as limiting. The Table illustrates the occurrence of SMI events and the corresponding status of first and second processors.

In Step 1, SMI Event 1 is issued and both processors enter the SMI handler for Event 1. In Step 2, SMI Event 1 is handled, because all of the processors are in the SMI handler for Event 1. Although not shown, one of the processors would have been selected to handle the SMI event. In step 3, Processor #1 exits the SMI Handler for Event 1, but Processor #2 does not. The latency in Processor #2 exiting SMI Event 1 may be caused by various conditions known to those skilled in the art. In step 4, SMI Event 2 has been issued. In step 5, Processor #1 enters SMI Event 2, but Processor #2 keeps SMI Event 2 pending because it still has not exited SMI Event 1. In step 6, SMI Event 3 is issued. In step 7, Processor #1 latches SMI Event 3 while Processor #2 loses SMI Event 3 because the processor can only handle one current SMI event (Processor #2 was currently handling SMI Event 1) and latch one pending SMI event (Processor #2 had already latched SMI Event 2).

Processor #2 exits SMI Event 1 in step 8, then enters SMI Event 2 in step 9. In step 10, SMI Event 2 is handled, because all of the processors are in the SMI handler for Event 2. In step 11, Processor #1 and Processor #2 both exit SMI Event 2. Since Processor #1 has SMI Event 3 latched or pending, Processor #1 enters SMI Event 3 is step 12. Processor #1 then waits for Processor #2 to enter SMI Event 3, but, as shown in step 7, Processor #1 has lost SMI Event 3. Accordingly, Processor #1 cannot handle SMI Event 3 since all of the processors are not in the SMI handler for that event. In step 13, the SMI handler for Processor #1 reaches a timeout after unsuccessfully waiting for Processor #2 to enter SMI Event 3. However, in accordance with the present invention, the SMI handler for Processor #2 then schedules SMI Event 4 in step 14. In step 15, SMI Event 4 is issued and received by the processors. As shown, Processor #1 keeps SMI Event 4 pending and Processor #2 enters SMI Event 4. In step 16, Processor #1 exits SMI Event 3 so that it can enter SMI Event 4 in step 17. Because all of the processors are then in the SMI handler for Event 4, SMI Event 4 is handled in step 18. Both Processor #1 and Processor #2 exit SMI Event 4 in step 19. As described, the invention enabled a lost SMI event to be handled by rescheduling a further SMI event based upon the content of the lost SMI.

TABLE 1

Hypothetical Status of Multiple Processors Receiving Multiple SMI Events

| Step | System Management Interrupts | Processor #1 | Processor #2 |
|---|---|---|---|
| 1 | SMI Event 1 | Enters SMI Event 1 | Enters SMI Event 1 |
| 2 | | All Processors in SMI Handler for Event 1; Handle SMI Event 1 | |
| 3 | | Exits SMI Event 1 | |
| 4 | SMI Event 2 | | |
| 5 | | Enters SMI Event 2 | Keeps SMI Event 2 Pending |
| 6 | SMI Event 3 | | |
| 7 | | Keeps SMI Event 3 Pending | Loses SMI Event 3 |
| 8 | | | Exits SMI Event 1 |
| 9 | | | Enters Pending SMI Event 2 |
| 10 | | All Processors in SMI Handler for Event 2; Handle SMI Event 2 | |
| 11 | | Exits SMI Event 2 | Exits SMI Event 2 |
| 12 | | Enters SMI Event 3 | |
| 13 | | Timeouts for Other Processors to be in SMI Event 3 | |
| 14 | | Schedules SMI Event 4 | |
| 15 | Scheduled SMI Event 4 | Keeps Scheduled SMI Event 4 Pending | Enters Scheduled SMI Event 4 |
| 16 | | Exits SMI Event 3 | |
| 17 | | Enters Pending SMI Event 4 | |
| 18 | | All Processors in SMI Handler for Event 4; Handle SMI Event 4 | |
| 19 | | Exits SMI Event 4 | Exits SMI Event 4 |

Example 2

A Two Processor System having a Selected Processor with a Pending SMI Event at the Time the Selected Processor Schedules a Further SMI Event (Hypothetical)

This example illustrates the importance that the processors exit the SMI handler before a scheduled SMI is issued. Steps 1 through 12 in Table 2 are the same as in Table 1 and the description of these steps will not be repeated here. The distinction between the two Tables begins at step 20 in Table 2.

In step 20, SMI Event 4 is issued before Processor #1 has timed out in step 21, scheduled a further SMI Event 5 in step 22, and exited SMI Event 4 in step 23. Accordingly, in step 20 Processor #1 keeps SMI Event 4 pending and Processor #2 enters SMI Event 4. Therefore, after exiting the SMI Event 3, Processor #1 enters pending SMI Event 4 in step 24. Because all of the processors are then in the SMI handler for Event 4, SMI Event 4 is handled in step 25 and both Processor #1 and Processor #2 exit SMI Event 4 in step 26. Because both processor have exited all SMI events and have not pending SMI events, the occurrence of the scheduled SMI Event 5 in step 27 leads to both processors entering the schedule SMI Event 5, followed by handling the SMI Event 5 in step 28 and exiting SMI Event 5 in step 29.

It should be noted, however, that if Processor #1 had not exited SMI Event 3 until after the occurrence of the scheduled SMI Event 5, then Processor #1 would have lost SMI Event 5 and Processor #2 would have then had to schedule yet another SMI Event based on the content of SMI Event 5. Accordingly, it is preferred that the method of the present invention include exiting a current SMI Event before the occurrence of a schedule SMI Event based on the content of that same current SMI Event.

TABLE 2

Hypothetical Status of Multiple Processors Receiving Multiple SMI Events

| Step | System Management Interrupts | Processor #1 | Processor #2 |
|---|---|---|---|
| 1 | SMI Event 1 | Enters SMI Event 1 | Enters SMI Event 1 |
| 2 | | All Processors in SMI Handler for Event 1; Handle SMI Event 1 | |
| 3 | | Exits SMI Event 1 | |
| 4 | SMI Event 2 | | |
| 5 | | Enters SMI Event 2 | Keeps SMI Event 2 Pending |
| 6 | SMI Event 3 | | |
| 7 | | Keeps SMI Event 3 Pending | Looses SMI Event 3 |
| 8 | | | Exits SMI Event 1 |
| 9 | | | Enters Pending SMI Event 2 |
| 10 | | All Processors in SMI Handler for Event 2; Handle SMI Event 2 | |
| 11 | | Exits SMI Event 2 | Exits SMI Event 2 |
| 12 | | Enters SMI Event 3 | |
| 20 | SMI Event 4 | Keeps SMI Event 4 Pending | Enters SMI Event 4 |

TABLE 2-continued

Hypothetical Status of Multiple Processors Receiving Multiple SMI Events

| Step | System Management Interrupts | Processor #1 | Processor #2 |
|---|---|---|---|
| 21 | | Timeouts for Other Processors to be in SMI Event 3 | |
| 22 | | Schedules SMI Event 5 | |
| 23 | | Exits SMI Event 3 | |
| 24 | | Enters Pending SMI Event 4 | |
| 25 | | All Processors in SMI Handler for Event 4; Handle SMI Event 4 | |
| 26 | | Exits SMI Event 4 | Exits SMI Event 4 |
| 27 | Scheduled SMI Event 5 | Enters Scheduled SMI Event 5 | Enters Scheduled SMI Event 5 |
| 28 | | All Processors in SMI Handler for Event 5; Handle SMI Event 5 | |
| 29 | | Exits SMI Event 5 | Exits SMI Event 5 |

FIG. 1 is logic diagram of a method 30 for handling multiple SMI events in a multiprocessor system. In step 32, a processor detects an SMI event, such as would occur over an Advanced Programmable Interrupt Controller (APIC) bus. The processor then enters an SMI handler in step 34, and determines whether all of the processors in the multiprocessor system are in the SMI handler for the detected event in step 36. Any of the processors that have entered the SMI handler may be selected to make this determination. If all of the processors are in the SMI handler, then the SMI event is handled in step 38 and all processors exit the SMI handler in step 40. The processors then return to step 32 to monitor and detect further SMI events.

If it is determined, in step 36, that fewer than all of the processors in the multiprocessor system are in the SMI handler for the detected event, then a selected processor that is in the SMI handler will schedule a new SMI event based on the detected event in step 42. All processors that were in the SMI handler are instructed to exit in step 44. Preferably, the method includes a delay step 46, prior to actually issuing the scheduled SMI event in step 48 so that the processors have time to exit the SMI handler before the scheduled SMI event is received.

Figure 2:
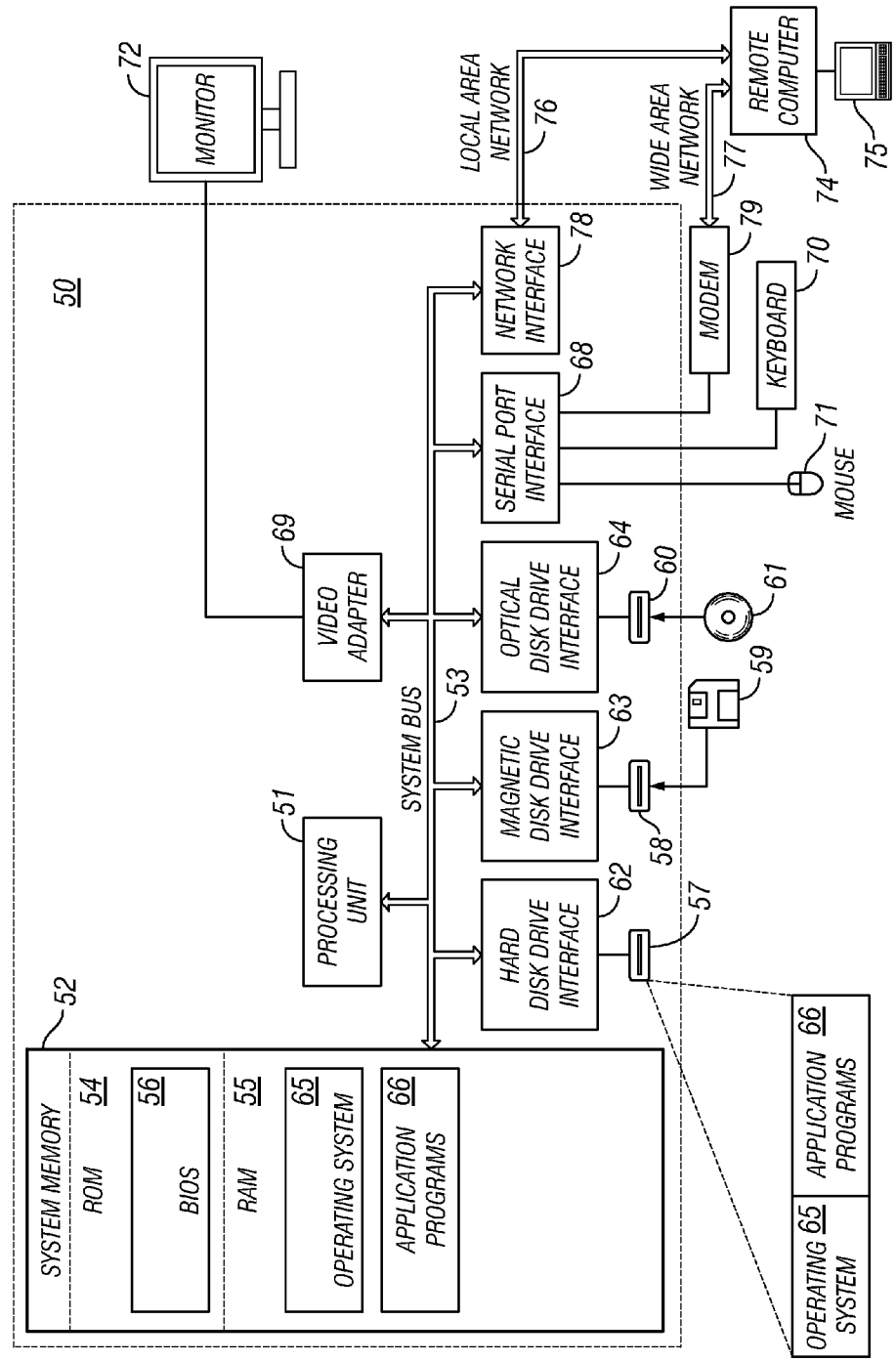
FIG. 2 is a schematic diagram of a computer system capable of supporting multiple processors.

FIG. 2 is a schematic diagram of a computer system 50 that is capable of supporting the use of multiple processors. The system 50 may be a general-purpose computing device in the form of a conventional personal computer 50. Generally, a personal computer 50 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory includes a read-only memory (ROM) 54 and random-access memory (RAM) 55. A basic input/output system (BIOS) 56, containing the basic routines that help to transfer information between elements within personal computer 50, such as during start-up, is stored in ROM 54.

Computer 50 further includes a hard disk drive 57 for reading from and writing to a hard disk 57, a magnetic disk drive 58 for reading from or writing to a removable magnetic disk 59, and an optical disk drive 60 for reading from or writing to a removable optical disk 61 such as a CD-ROM or other optical media. Hard disk drive 57, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs hard disk 57, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for computer 50. For example, the operating system 65 and application programs 66 may be stored in the hard disk 57 or in RAM 55 of the computer 50.

A user may enter commands and information into personal computer 50 through input devices, such as a keyboard 70 and a pointing device, such as a mouse 71. Other input devices (not shown) may include a microphone, joystick, game pad, satellite dish, scanner, or the like. These and other input devices are often connected to processing unit 51 through a serial port interface 68 that is coupled to the system bus 53, but input devices may be connected by other interfaces, such as a parallel port, game port, a universal serial bus (USB), or the like. A display device 72 may also be connected to system bus 53 via an interface, such as a video adapter 69. In addition to the monitor, personal computers typically include other peripheral output devices (not shown), such as speakers and printers.

The computer 50 may operate in a networked environment using logical connections to one or more remote computers 74. Remote computer 74 may be another personal computer, a server, a client, a router, a network PC, a peer device, a mainframe, a personal digital assistant, an Internet-connected mobile telephone or other common network node. While a remote computer 74 typically includes many or all of the elements described above relative to the computer 50, only a memory storage device 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 50 is often connected to the local area network 76 through a network interface or adapter 78. When used in a WAN networking environment, the computer 50 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 50, or portions thereof, may be stored in the remote memory storage device 75. It will be appreciated that the network connections shown are exemplary and other means of establishing a communications link between the computers may be used. A number of program modules may be stored on hard disk 57, magnetic disk 59, optical disk 61, ROM 54, or RAM 55, including an operating system 65 and browser 66.

The computer shown in FIG. 2 should not imply that the invention has architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 3:
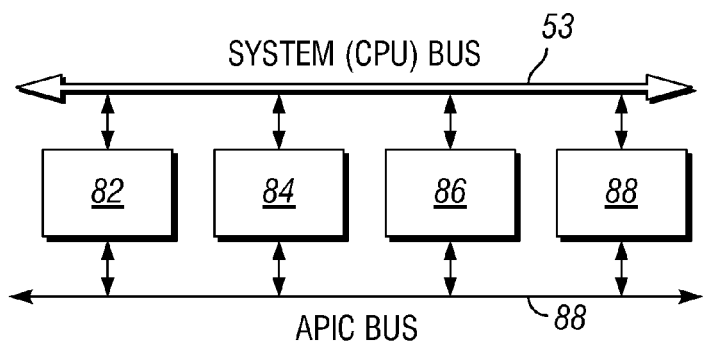
FIG. 3 is a schematic diagram of multiple processors in communication with a system bus and also an APIC bus.

FIG. 3 is a schematic diagram of multiple processors 80, 82, 84, 86 in communication with a system bus 53 (shown in FIG. 2) and also an Advanced Programmable Interrupt Controller (APIC) bus 88. An APIC bus allows communication between processors and other devices in a manner that is not controlled by the operating system.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for handling multiple SMI events in a multiprocessor system, comprising:
    a first set of one or more processors in the multiprocessor system receiving a first SMI event;
    the first set of processors entering an SMI handler for the first SMI event;
    determining that fewer than all of the active processors in the multiprocessor system are in the SMI handler for the first SMI event;
    scheduling a second SMI event based upon the content of the first SMI event; and
    the first set of processors each exiting the SMI handler for the first SMI event without handling the first SMI event.

2. The method of claim 1, wherein the step of determining that fewer than all of the active processors in the multiprocessor system are in the SMI handler for the first SMI event includes waiting for a period of time before scheduling the second SMI event, wherein the period of time has a duration sufficient to allow processors to enter the SMI handler for the first SMI event under typical conditions had the first SMI event been received.

3. The method of claim 1, further comprising:
    handling the second SMI event as a result of determining that all of the active processors in the multiprocessor system are in the SMI handler for the second SMI event.

4. The method of claim 1, wherein the first set of processors each exit the SMI handler for the first SMI event before the occurrence of the second SMI event.

5. The method of claim 4, further comprising:
    allowing the first set of processors to enter the SMI handler for a third SMI event that was pending while the first set of processors were in the SMI handler for the first SMI event; and
    handling the third SMI event so long as all of the active processors in the multiprocessor system are in the SMI handler for the third SMI event.

6. The method of claim 1, wherein the first set of processors each exit the SMI handler for the first SMI event before the occurrence of the second SMI event if the SMI handler has a pending SMI event at the time that the second SMI event is being scheduled.

7. The method of claim 1, further comprising:
    scheduling an additional SMI event for an SMI event that is pending at the time that the second SMI event is being scheduled, wherein the additional SMI is based upon the content of the pending SMI event; and
    canceling the pending SMI event without handling the pending SMI event.

8. The method of claim 1, further comprising:
    a second set of one or more processors in the multiprocessor system that are in the SMI handler for a third SMI event scheduling a fourth SMI event based upon the content of the third SMI; and
    the second set of processors each exiting the SMI handler for the third SMI event without handling the third SMI event.

9. The method of claim 1, further comprising:
    handling any particular SMI event as a result of determining that all of the active processors in the multiprocessor system are in the SMI handler for that particular SMI event.

* * * * *